United States Patent

Inaki et al.

[11] Patent Number: 5,876,473
[45] Date of Patent: Mar. 2, 1999

[54] METHOD OF PRODUCING CRISTOBALITE CONTAINING SILICA GLASS

[76] Inventors: Kyoichi Inaki, 1-9-9 Midorigaoka-nishi; Tohru Segawa, 2-46 Hidenoyama, Asaka-Machi; Nobumasa Yoshida, 1-14-1 Midorigaoka-nishi; Mamoru Endo, 1-51-40 Kameda, all of Koriyama-shi Fukushima, Japan

[21] Appl. No.: 727,552
[22] PCT Filed: Feb. 27, 1996
[86] PCT No.: PCT/EP96/00794
§ 371 Date: Oct. 25, 1996
§ 102(e) Date: Oct. 25, 1996
[87] PCT Pub. No.: WO96/26908
PCT Pub. Date: Sep. 6, 1996

[30] Foreign Application Priority Data

Feb. 28, 1995 [JP] Japan ..................................... 7-64876
Mar. 31, 1995 [JP] Japan ..................................... 7-97494

[51] Int. Cl.[6] .............................. C03B 20/00; C03B 5/00; C03C 10/14
[52] U.S. Cl. ................................ 65/32.1; 65/33.1; 65/66; 501/4
[58] Field of Search ..................................... 65/17.3, 33.1, 65/32.1, 33.7, 33.8, 33.4, 66, DIG. 8; 501/4; 428/432, 433, 434, 312.6, 314.6, 325

[56] References Cited

U.S. PATENT DOCUMENTS

| | | | |
|---|---|---|---|
| 3,113,877 | 12/1963 | Janakirama-Rao | 65/33.1 |
| 4,018,615 | 4/1977 | Mills | 106/69 |
| 4,180,409 | 12/1979 | Mansmann | |
| 4,473,653 | 9/1984 | Rudoi | 501/4 |
| 4,828,593 | 5/1989 | Morishita et al. | 65/33.1 |
| 4,935,046 | 6/1990 | Uchikawa et al. | 65/17.3 |
| 5,053,359 | 10/1991 | Loxley et al. | 65/33.7 |
| 5,389,582 | 2/1995 | Loxley et al. | 501/4 |

FOREIGN PATENT DOCUMENTS

| | | | |
|---|---|---|---|
| 634437 | 1/1962 | Canada | 501/4 |
| 2291953 | 6/1976 | France | |
| 1-126238 | 5/1989 | Japan | |

OTHER PUBLICATIONS

English language translation of JP 1–126238.
T. I. Prokhorova et al., "A New Material—Quartz Light–Diffusing Glass", Glass and Ceramics, vol. 48, No. 7/8, pp. 285–287, Jul. 1991.
English Language Abstract of DD 295619, Nov. 1991.
English Language Abstract of JP 62–202826, Sep. 1987.

*Primary Examiner*—Steven P. Griffin
*Attorney, Agent, or Firm*—Whitman Breed Abbott & Morgan LLP

[57] ABSTRACT

Cristobalite-containing silica glass is provided wherein α-cristobalite in the shape of a small sphere or a small, round-edged or sharp-edged, three-dimensional region is dispersed in the silica glass matrix. The diameter of each α-cristobalite sphere or region is, in the range of 0.1 um to 1000 um, and the content of the α-cristobalite is at least 10 wt. %. The cristobalite-containing silica glass is produced by heating a mixture of two kinds or more of crystalline silicon dioxide powder with melting points different from each other by 20° C. or more. The mixture contains silicon dioxide having the highest melting point in the range of 10 wt. % to 80 Wt. % and is heated at temperatures ranging from the lowest melting point to a temperature lower than the highest melting point.

4 Claims, 3 Drawing Sheets

CRYSTAL     GLASS

METHOD OF PRODUCING CRISTOBALITE CONTAINING SILICA GLASS

BACKGROUND OF THE INVENTION

1. Field of Invention

The present invention relates to new cristobalite-contained silica glass, a method of producing the silica glass and a silica glass jig made of the silica glass the surface of which is covered with a vapor-deposited thin film. More particularly, it relates to cristobalite-containing silica glass having α-cristobalite in the shape of a small sphere or a small, round-edged or sharp-edged, three-dimensional region dispersed in the silica glass matrix, a method of producing the α-cristobalite-contained silica glass and a silica glass jig made of the silica glass best used in a plasma etching process of semiconductor device fabrication.

2. Description of the Prior Art

Silica glass has been heretofore used in fields such as for a jig for use in semiconductor device fabrication and the like, wherein high purity, heat-resistance and chemical resistance are required, since silica glass is generally good in heat-resistance, chemical resistance and is also good in processability and cleanablity. With the recent advance in packing density of constituent elements in a chip of a very-large-scale integrated circuit, conditions under which a jig is used has been getting severer, so that it has become earnestly required that firstly any element never comes out at any extent from the jig in a semiconductor device fabrication process and thereby the jig does not contaminate a semiconductor device being fabricated, and, secondly, the jig is not subjected to thermal deformation, even at a treating temperature of higher than 1000° C. In such a technical situation, crystal-containing silica glass which is excellent in not only heat resistance, but also purity has drawn attention. For example, a crystal-containing silica glass is proposed in a published document of Unexamined Patent Application No. Hei 3-45029, which silica glass is produced by sintering a mixture of crystalline quartz and amorphous quartz. Another crystal-contained silica glass is proposed in Journal of the American Ceramic Society, Vol. 42, No. 6, pp 263–270, Jun. 1, 1959, in which a crystal phase is created in the silica glass matrix by doping aluminum and the like as a crystal forming agent.

However, since the crystal-contained silica glass described in Unexamined Patent Application No. Hei 3-45029 is produced by sintering, gaps are generated among small crystals in the silica glass matrix, and thereby the mechanical strength is low and the thermal expansion coefficient is smaller than that of silica glass. When a jig made of such crystal-containing silica glass is used in a chemical vapor deposition process for a semiconductor device fabrication and is cooled in a cooling process, a thin polysilicon or silicon nitride film deposited on the surface of the jig shrinks to a great extent and develops cracks therein, since the thermal expansion coefficients thereof, which are $1 \times 10^{-6}/°C$. or larger, are by far larger than that of the silica glass. Dust generated by peeling-off due to the cracks of part of the film causes the following problems. The dust floating in the atmosphere of the chemical vapor deposition process can contaminate a semiconductor device being fabricated. The cracks further advance into the body of the jig to finally break down the jig.

Because the crystal-contained silica glass proposed in the Journal of the American Ceramic Society above mentioned uses a crystal forming agent to form a crystal phase in the silica glass matrix, it has presents the problem that the crystal forming agent diffuses out impurities to thereby contaminate a semiconductor device being fabricated, when the jig is used in a temperature higher than 1000° C.

Further, with the same recent advance in packing density of constituent elements in a chip and the trend for finer patterning in the chip of a very-large-scale integrated circuit, precision processing on a finer scale, on the order of submicrons, has been applied to a silicon wafer and the traditional etching treatment of the silicon wafer has to also change to the plasma etching treatment. In the plasma etching treatment, a silica glass jig has a risk of being etched itself in a special gas atmosphere and as a result, the silicon wafer has a risk to be contaminated by generated particles from the jig. In light of the above drawback, a silica glass jig the surface of which is covered with a vapor deposited thin film made of metal or ceramic thereon has been proposed, but since the thermal expansion coefficient of silica glass is usually smaller than those of the metal or ceramic, the thin film contracts to a great extent and thereby has the problem that a crack occurs in the thin film when it is used in a high temperature treatment of a silicon wafer. This problem has blocked the practical application of a thin film on the surface of a jig.

SUMMARY OF THE INVENTION

In consideration of the current state of the technology, the present inventors have investigated development of a silica glass having high heat resistance, high purity and high thermal expansion coefficient and as a result, have reached a discovery that silica glass having the characteristics above mentioned can be produced by incorporating α-cristobalite in the shape of a small sphere or a small, round-edged or sharp-edged, three-dimensional region dispersed in the bulk of a silica glass matrix and further the silica glass with a lower light transmission is obtained by dispersing small-sized independent bubbles at a content in a range in the matrix as compared with that of the silica glass with no independent bubbles. The present inventors have also discovered the fact that silica glass with all the characteristics above mentioned can be produced with ease by heating to melt a mixture of two or more kinds of crystalline silicon dioxide powder which have different melting points from each other by 20° C. or more at a temperature in a range. A first aspect of the present invention has been completed on the basis of such knowledge as mentioned above.

In consideration of the current state of the technology, the present inventors have also investigated with extreme efforts about development of a silica glass jig made of a silica glass best used in a plasma etching process of semiconductor device fabrication. The present inventors have discovered facts that a silica glass not only with a thermal expansion coefficient which is on the same order of that of a vapor-deposited thin film covering the surface of the silica glass jig, but also with high heat resistance is easily produced by heating to melt a mixture of two or more kinds of crystalline silicon dioxide powder which have different melting points more 20° C. or more apart at a temperature in a range, same as in the first aspect of the present invention. The present inventors have further discovered that when a thin film made of metal or ceramic which is excellent in resistance to plasma etching is deposited on the surface of the silica glass jig, the thin film has no chance for cracks to occur therein. Thereby, the silica glass jig with the thin film thereon can prevent not only generation of particles but also particle-contamination of a silicon wafer. Thus, a long lasting jig for use in a plasma etching treatment can be obtained. A second aspect of the present invention has been completed on the basis of the discoveries mentioned above.

It is an object of the present invention, accordingly, to provide cristobalite-containing silica glass having high purity, high heat resistance and large thermal expansion coefficient.

It is another object of the present invention to provide a crystobalite-contained silica glass having high purity, high heat resistance, large thermal expansion coefficient and light transmittance of 1% or less at a wavelength in the region between 0.2 μm and 5 μm at a sample thickness of 4 mm.

It is a further object of the present invention to provide a method of producing new cristobalite-containing silica glass.

It is a still further object of the present invention to provide a method of producing cristobalite-containing silica glass with small-sized independent bubbles dispersed therein.

It is another object of the present invention to provide a silica glass jig with high purity and high resistance to plasma etching.

It is a further object of the present invention to provide a silica glass jig having less of a chance to contaminate a silicon wafer by particles originated from a thin film deposited thereon in a semiconductor fabrication process.

DESCRIPTION OF THE PREFERRED EMBODIMENTS

Figure 1:
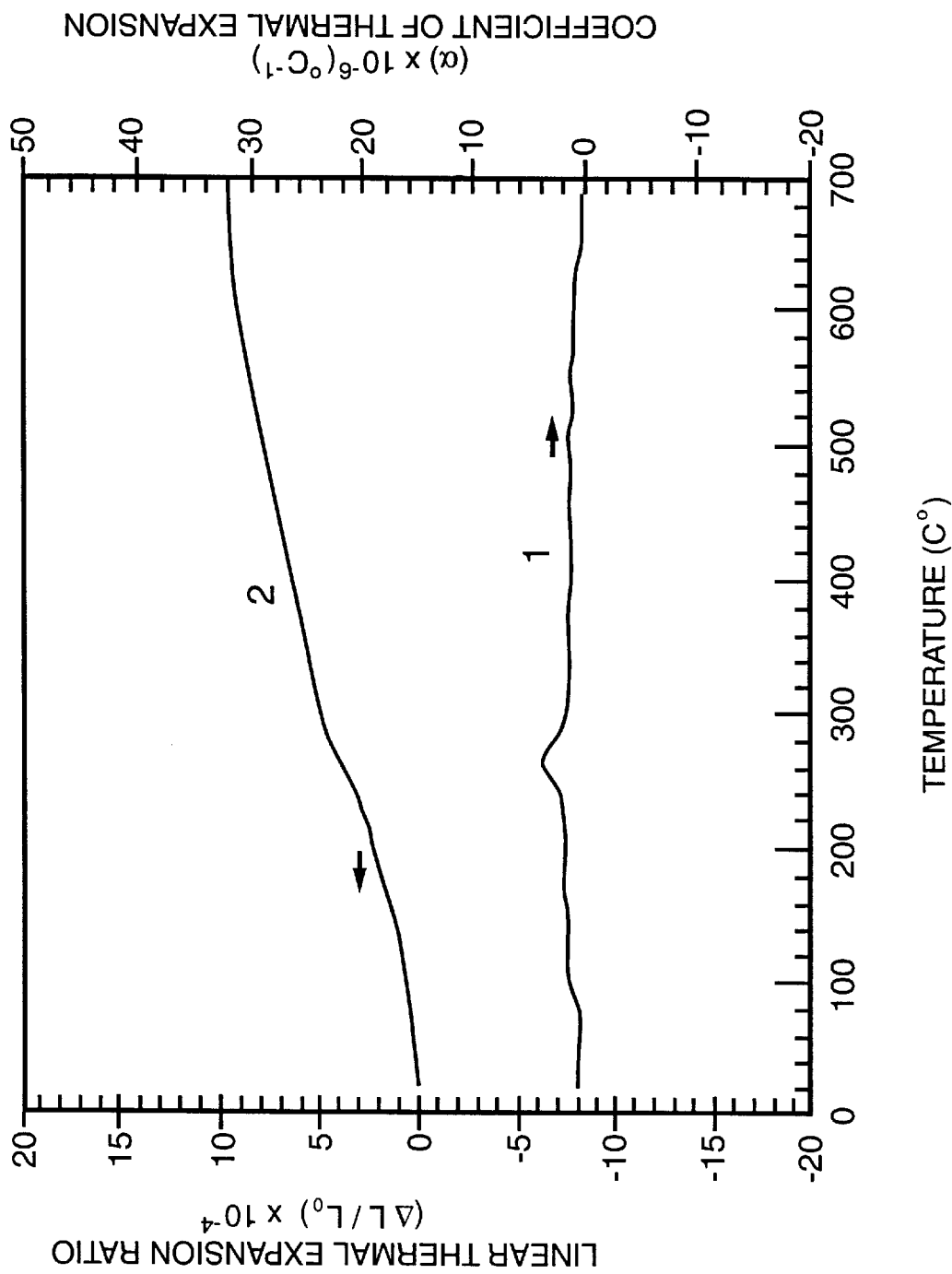
FIG. 1 shows a graph of thermal expansion relative to temperature of composition of the invention.

The first aspect of the present invention is directed to cristobalite-containing silica glass wherein α-cristobalite in the shape of a small sphere or a small, round-edged or sharp-edged, three-dimensional region is dispersed at a content of at least 10 wt % in the silica glass matrix and the diameter of each sphere or region is in the range of 0.1 μm to 1000 μm.

The first aspect of the present invention is directed to the cristobalite-containing silica glass wherein small-sized independent bubbles are additionally contained and uniformly dispersed in the silica glass matrix, the diameter of each bubble being 500 μm or smaller.

The first aspect of the present invention is directed to a method of producing the cristobalite-containing silica glass The second aspect of the present invention is directed to a silica glass jig the surface of which is covered with a metal or ceramic thin film wherein the silica glass of the jig is cristobalite-containing silica glass of the present invention.

The cristobalite-containing silica glass of the present invention has cristobalite in the shape of a small sphere or a small, round-edged or sharp-edged, three-dimensional region dispersed in the silica glass matrix, a diameter of each small sphere or region is in the range of 0.1 μm to 1000 μm and a content of the cristobalite is in the range of 10 wt % to 99 wt %. The thermal expansion coefficient of silica glass is increased by containing the cristobalite phase in the matrix and can be adjusted to a value equal to or larger than $1 \times 10^{-6}/°C$. which is a thermal expansion coefficient of a vapor-deposited film formed in a chemical vapor deposition process. When the diameter of each α-cristobalite sphere or region is less than 0.1 μm, not only improvement of heat resistance of, but also increase in thermal expansion coefficient of the α-cristabalite-containing silica glass are not observed and when the diameter is larger than 1000 μm, the mechanical strength of the α-cristobalite-contained silica glass is reduced to an extent at which it cannot be used any practical purpose. When a content of the α-cristobalite-containing silica glass is less than 10 wt %, increase in the thermal expansion coefficient is negligible and when the content is greater than 99 wt %, cracks are generated in the body of the α-cristobalite-containing silica glass.

When the α-cristobalite-containing silica glass according to the present invention is produced by heating to melt a mixture of two or more kinds crystalline silicon dioxide powder with the melting points 20° C. or more apart, with a content of α-cristobalite more than 80 wt %, cracks usually occur in the body of the α-cristobalite-contained silica glass, but even with a content of α-cristobalite of 99 wt %, it is possible that cracks will not occur in a body of the α-cristobalite-containing silica glass, if it is re-heated at a temperature of 1000° C. or higher and thereby a crystal of α-cristobalite is gradually grown. The re-heating time changes dependent on a content of α-cristobalite. When a content of the silicon dioxide powder having the highest melting point in the mixture is larger, the re-heating time can be decreased and vice versa. Any atmosphere can be chosen in the heat treatment.

The cristobalite-containing silica glass becomes opaque due to the presence of crystobalite phase in the matrix, because cracks are generated between the crystal of cristobalite and the silica glass matrix, and the cracks scatter incident rays. With additional incorporation of independent small-sized bubbles in the silica glass matrix, a degree of opaqueness can be increased. The diameter of each bubble dispersed in the matrix is preferably 500 μm or less, and the concentration is preferably in the range of 100 bubbles/cm$^3$ to 100,000 bubbles/cm$^3$. The cristobalite-containing silica glass which, in addition to the above characteristics, has a density of 2.0 g/cm$^3$ or more and a three-point bending strength of 150 kg/cm$^2$ or more can be effectively used as material of a jig for use in semiconductor device fabrication. The light transmission can be reduced to a smaller value by re-heating a crystal of α-cristobalite to grows a greater degree and it can be adjusted to a value of 1% or less. It is possible to manufacture a jig such as an excellent heat-ray scattering member from the crystal-contained silica glass with a low light transmission such as this. According to the present invention, content of independent bubbles in the matrix can be lowered to a value of the order of one tenth in comparison with that of a traditional opaque quartz glass, while the degree of opaqueness is still better than that of the traditional opaque quartz glass.

The cristobalite-containing silica glass is produced in the steps of first charging a raw material mixture of two or more kinds of crystalline silicon dioxide powder the melting points of which differ from each other by 20° C. or more, the silicon dioxide powder having the higher melting point being mixed at a content of 10 wt % to 80 wt %, and the particle size of differ powder is in the range of 10 μm to 1000 μm in a heat resistant mold, and second heating the mold and the charged mixture at a temperature between the lowest melting point and a temperature less than the highest melting point of the ingredients of the mixture.

In the process, it is preferable to provide heating and cooling conditions such that, in an inert atmosphere, firstly the mixture is heated at a first heating speed of 10° C./min to 50° C./min from room temperature to 1000° C., secondly at a second heating speed of 10° C./min or lower from the 1000° C. up to a first temperature in the range of the lowest melting point to a second temperature of 10° C. higher than the lowest melting point, thirdly, slowly raising from the first temperature up to a third temperature lower than the highest melting temperature, and fourthly the mixture is constantly kept at the third temperature.

In the same process wherein nitrogen gas flows at a flow rate of 5 l/min to 20 l/min in the atmosphere thereof, cristobalite-containing silica glass having independent bubbles dispersed in the silica glass matrix, which bubbles have a diameter of 500 μm or smaller and a concentration of 100 bubbles/cm$^3$ to 100,000 bubbles/cm$^3$ can be produced.

In the above mentioned method of production, alpha-quartz is used as crystalline silicon dioxide and the structural form of α-quartz transits to β-quartz, β-tridymite and to β-cristobalite when heated to melting and if the β-cristobalite is heated at a temperature of the melting point or higher, the crystal changes into a liquid in a vitrified state. Silica glass is obtained by cooling down the β-cristobalite in the vitrified state to room temperature to reach a supercooled condition. The melting point of β-cristobalite is 1723° C. according to a technical document. However, the present inventors have discovered facts that melting points of crystalline silicon dioxides produced from mines differ from each other by 20° C. or more. A fact of the different melting points can be probably explained by the reasoning that if the natural silicon dioxides in an investigation all are β-cristobalite, the structural form of crystal of each silicon dioxide can be still different from each other depending on the mineral veins from which the silicon dioxides are produced.

In a heating process of the method mentioned above, the silicon dioxide powder having the lowest melting point is first melted to form a silica glass matrix and, on the other hand, the silicon dioxide powder having the highest melting point remains unmelted to form cristobalite regions. Thus produced crystal-contained silica glass contains neither impurities such as a crystal forming agent or gaps formed by sintering and thereby is high both in purity and in mechanical strength, since it is produced by neither sintering nor doping a crystal forming agent. The structural form of α-cristobalite is one form of SiO$_2$ crystal. The fact that the size of a crystal region is smaller than the size of each particle of the crystalline silicon dioxide powder having the highest melting point seemingly comes from the cause that particles of the crystalline silicon dioxide powder are further pulverized to smaller sizes in the vitrification process.

It can be seen from the above explanation that a kind of crystalline silicon dioxide is chemically synthesized that has a different melting point by 20° C. or more from those of the other kinds of crystalline silicon dioxide in the mixture.

In the method according to the present invention, a carbon-made mold, a ceramic-made mold and a transparent quartz tube inserted in the molds just mentioned are named as heat resistant molds for use in charging a mixture of crystalline silicon dioxide powder. In the case of using a transparent quartz tube, high purity of the raw material charged can be maintained and at the same time silica glass produced without a chance of the bulk form of collapsing. In these points, a transparent quartz tube as a mold is excellent. An electric-melting method is adopted as a heating means for melting, since it has a little chance for OH groups to be mixed in silica glass, and thereby silica glass, highly heat-resistant is produced. As an atmosphere in the method, an inert gas atmosphere such as a nitrogen atmosphere or a vacuum atmosphere is generally used. When a mold is made of carbon, an inert gas atmosphere is specially required, but when a mold is made of ceramic, the gas in the atmosphere need not be so specific.

The body of a jig according to the present invention is made of crystal-containing silica glass produced in the method above mentioned. The surface of the jig is covered with a thin film of 2 nm or more thick made of metal or ceramic vapor-deposited by means of CVD method or the like which film has an excellent resistance to plasma etching. As metal or ceramic of which the thin film is made, Al$_2$O$_3$, SiC, Si$_3$N$_4$, Si, Carbon, or the like is identified. The thermal expansion coefficients of these metals or ceramics are in the range of 1×10$^{-6}$/°C. to 1×10$^{-5}$/°C. It is required, therefore, that a thermal expansion coefficient of the crystal-containing silica glass as a material of a jig is selected so as to be in the range. For the purpose, it is further necessary that sizes of the α-cristobalite regions and a content of the α-cristobalite are properly adjusted. Such an adjustment is properly effected by gradually reheating the crystal-containing silica glass as produced in the above mentioned method at a temperature of 1000° C. or higher to grow crystal regions both in size and in content to a desired extent.

A silica glass jig of the present invention has little risk to suffer from etching even in a plasma etching process applied for semiconductor device fabrication, wherein a degree of etching is only at one-tenth of that of a traditional jig or less and besides, no particle is generated from a vapor-deposited thin film in a CVD process.

The present invention will be in concrete terms described in reference to examples below, but it should be understood that the present invention is not limited to the specific embodiments thereof except as defined in the appended claims.

Physical properties described in the examples are measured as described here.

Thermal Expansion Coefficient of Cristobalite-Contained Silica Glass:

Micro constant load dilatometer made by Rigaku Denki K. K. was used. The specimen was heated from room temperature to 700° C. at a heating speed of 2° C./min and the distance between two points is measured in the course of heating up. Coefficients of thermal expansion were obtained by a following equation (1).

$$\alpha(°C.^{-1})=(\Delta L/Lo)\times(dL/dt) \qquad (1),$$

where Lo is the length of a sample at a reference temperature (25° C.), ΔL is an increment of the length at a temperature of measurement, dt is an infinitesimal difference in temperature (20° C.) and dL is an increment of the length in the difference in temperature dt. Coefficients of thermal expansion were computed by means of a central difference method with dt=20° C. The results are shown in FIG. 1. The average coefficient of thermal expansion was obtained from FIG. 1, which was 1.5×10$^{-6}$/°C. A strip of silica glass is used as a reference sample. A sample has a cross-section of 3 mm square and a length of 15 mm.

Size of a Cristobalite Region:

A scanning electron microscope is used to determine the size of each cristobalite region.

Light Transmittance:

The ratio of the energy of light transmitted through a sample to the energy of light radiated on a surface of the sample is measured where the sample was prepared in the shape of a small plate having a thickness of 2 mm by slicing a block with a diamond saw blade and the ratio was measured by a infrared spectrophotometer IR-700 made by Nihon Bunkou Kougyou K. K.

Structural Form of a Crystal:

An x ray diffraction analyzer was used to determine the structural form of a crystal.

Bending Strength:

A three-point bending test machine was used to determine the bending strength of a sample at room temperature.

EXAMPLES

Example 1

Two kinds of crystalline silicon dioxide powder of IOTA CGU-FINE natural quartz sand having a grain size range of 100 μm to 250 μm and Iota 6 Fine having a grain size range of 100 μm to 250 μm both produced by Unimin Corporation were mixed at a ratio of 80:20 in a ball mill made of silica glass.

Figure 2:
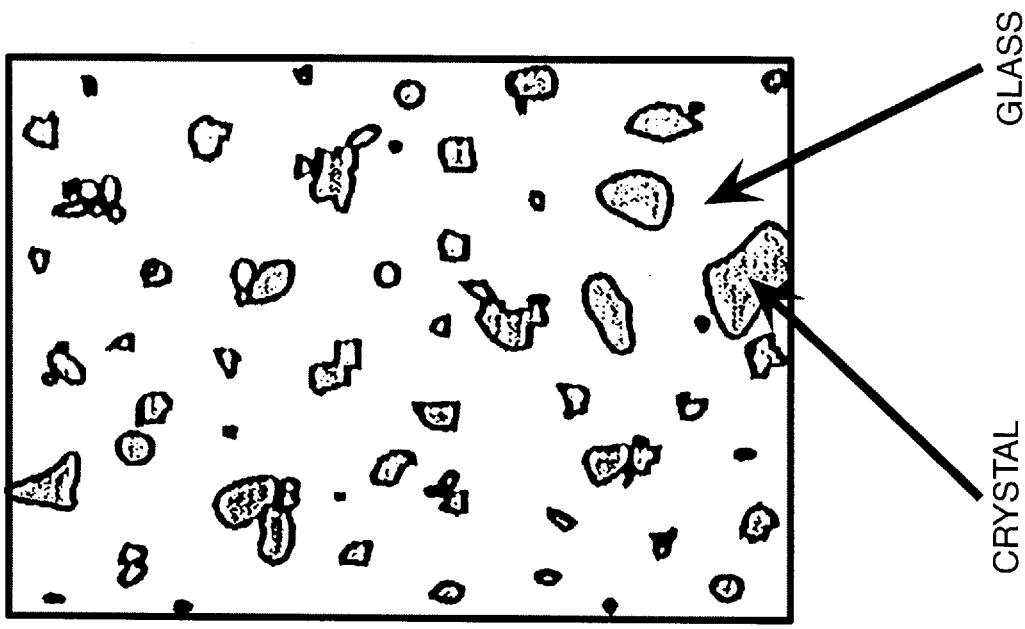
FIG. 2 shows schematically the crystal structure of example 1 hereof under a electron microscope.
Figure 4:
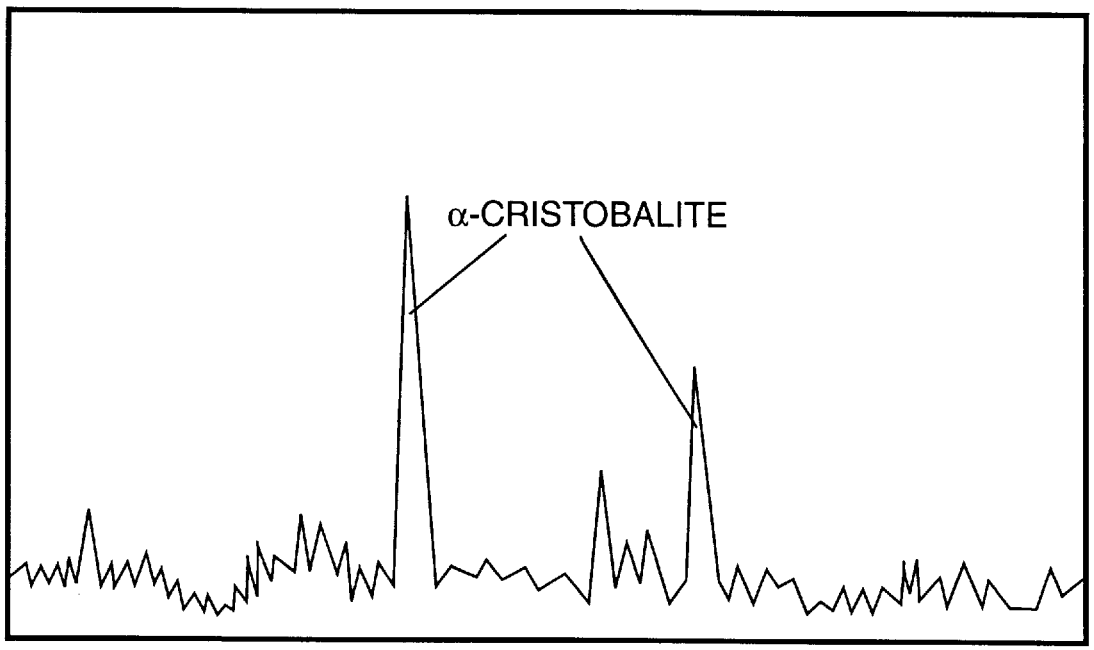
FIG. 4 shows a chart of x-ray diffraction of example 1.

The powder mixture was charged in a silica glass tube inserted in a carbon made mold, then the air lying in the gaps between the particles of the powder mixture was removed by vacuum suction. After completion of air removal, the space in the silica glass tube was filled with nitrogen gas. In the nitrogen atmosphere the powder mixture was heated from room temperature to 1000° C. in 90 min, from the 1000° C. to 1200° C. in 30 min, from the 1200° C. to 1630° C. in 90 min, and from the 1630° C. to 1720° C. in 180 min and then kept at a constant temperature of the 1720° C. for 1 h. The powder mixture thus treated became cristobalite-contained silica glass. In the cristobalite-contained silica glass, α-cristobalite in the shape of a small sphere of about 40 μm in diameter was observed at a content of 30 wt % in the silica glass matrix. Observation by an electron microscope was schematically drawn in FIG. 2 to show the feature thereof. The sizes of crystalline regions, thermal expansion coefficient, light transmission, and bending strength were measured on samples of the cristobalite-contained silica glass and the results are shown in Table 1. Besides, the measurement of x ray diffraction is shown in FIG. 4 and from the chart, the structural form of the crystal regions was identified as α-cristobalite, as shown in FIG. 4.

Example 2

Figure 3:
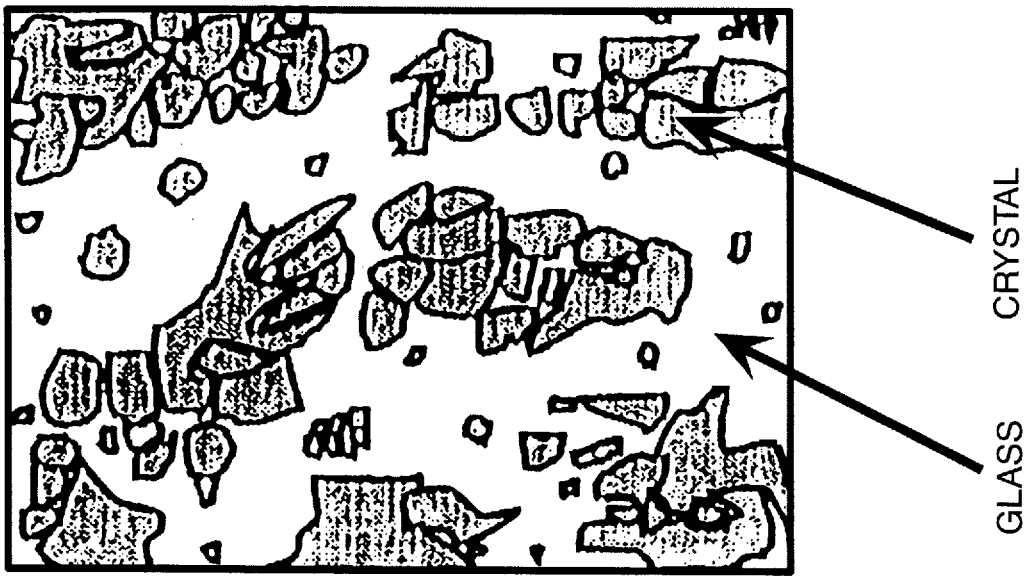
FIG. 3 shows schematically the crystal structure of example 2 hereof under a electron microscope.

The cristobalite-contained silica glass produced in Example 1 was further heated at 1400° C. for 60 h. An α-cristobalite region had grown to that of about 100 μm in diameter. Observation by the electron microscope is schematically shown in FIG. 3. The sizes of the cristobalite regions and the thermal expansion coefficient, light transmission, and bending strength of the cristobalite-contained silica glass were measured and the results are shown in Table 1. The structural form of a crystal zone in the silica glass matrix was identified as α-cristobalite by the x ray diffraction analyzer.

Example 3

Cristobalite-contained silica glass was produced in the same way as in Example 1 with an exception that a mixture of crystalline silicon dioxide powder was prepared from IOTA CGU-FINE and IOTA 6-FINE and natural quartz sand at a ratio of 50:50. The sizes of cristobalite regions and thermal expansion coefficient, light transmission, and bending strength of the cristobalite-contained silica glass thus produced were measured and the results are shown in Table 1. The structural form of a crystal region in the silica glass matrix was identified as α-cristobalite by the x ray diffraction analyzer.

Example 4

The cristobalite-contained silica glass produced in Example 3 was further heated at 1400° C. for 20 h. An α-cristobalite region had grown to that of about 100 μm in diameter. The sizes of the cristobalite regions and the thermal expansion coefficient, light transmission, and bending strength of the cristobalit-contained silica glass thus produced were measured and the results are shown in Table 1. The structural form of a crystal region in the silica glass matrix was identified as α-cristobalite by the x ray diffraction analyzer.

Example 5

Cristobalite-contained silica glass was produced in the same way as in Example 1 with an exception that the powder mixture was molten in an atmosphere in which nitrogen gas flew at a rate of 10 l/min. In the matrix of the produced cristobalite-contained silica glass, independent bubbles of diameters of 160 μm or smaller were observed at a concentration of 68.000 bubbles/$cm^3$ and the density was measured at 2.115 g/$cm^3$. The sizes of cristobalite regions and the thermal expansion coefficient, light transmission, and bending strength of the cristobalite-contained silica glass thus produced were measured and the results are shown in Table 1. The structural form of a crystal region in the silica glass matrix was identified as α-cristobalite by the x ray diffraction analyzer.

Comparative Example 1

Figure 5:
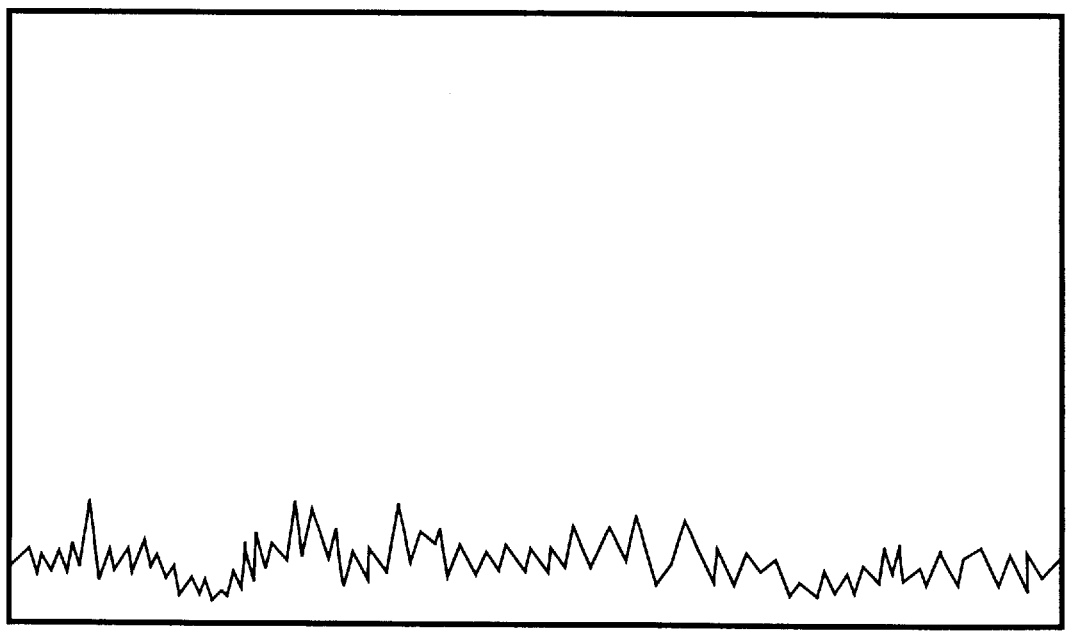
FIG. 5 shows a x-ray diffraction analysis of comparative example no. 1.

IOTA CGU-FINE natural quartz sand produced by Unimin Corporation was charged in a silica glass tube inserted in a carbon made mold and the powder was heated in a nitrogen atmosphere from room temperature to 1000° C. in 90 min, from the 1000° C. to 1200° C. in 30 min, from the 1200° C. to 1630° C. in 90 min, and from the 1630° C. to 1720° C. in 180 min and kept at a constant temperature of the 1720° C. for 1 h. The powder thus treated became opaque silica glass. The thermal expansion coefficient, light transmission, and bending strength of the opaque silica glass thus produced were measured and the results are shown in Table 1. Non-existence of a crystalline region in the silica glass matrix was confirmed as a result of an x ray diffraction analysis. A rocking curve obtained is shown in FIG. 5.

Comparative Example 2

IOTA 6-FINE natural quartz sand produced by Unimin Corporation was charged in a silica glass tube inserted in a carbon made mold and the powder was heated in a nitrogen atmosphere from room temperature to 1000° C. in 90 min, from the 1000° C. to 1200° C. in 30 min, from the 1200° C. to 1630° C. in 90 min, and from the 1630° C. to 1720° C. in 180 min and kept at a constant temperature of the 1720° C. for 1 h. The powder thus treated became opaque silica glass. The thermal expansion coefficient, light transmission, and bending strength of the opaque silica glass thus produced were measured and the results are shown in Table 1. Non-existence of a crystalline region in the silica glass matrix was confirmed as a result of an x ray diffraction analysis.

Comparative Example 3

The thermal expansion coefficient, light transmission, and bending strength of silica glass produced by an oxygen-hydrogen melting method were measured and the results are shown in Table 1. Non-existence of a crystalline region in the silica glass matrix was confirmed as a result of an x ray diffraction analysis.

Tests on Thin Films on Silica Glass Made Jigs

Thin films were coated on disks made of the crystal-contained silica glasses produced in Examples 1 to 5 and on disks made of traditional silica glass in Comparative examples 1 to 3 in the following conditions. Observations of the coating states of the thin films by the electron microscope are described in Table 2, where additional examples and comparative examples are respectively numbered as 6 to 10 and 4 to 6.

i) A polysilicon film of 50 μm thick was vapor-deposited from $SiH_4$ as a raw material at 600° C.

ii) An $Si_3N_4$ film of 50 μm thick was vapor-deposited from a mixture of mono-silane and ammonia as raw materials at about 300° C.

iii) An SiC film of 50 μm thick was vapor-deposited from a mixture of methane and silicon tetrachloride as raw materials at about 1200° C.

iv) A BN film of 50 μm thick was vapor-deposited from a mixture of $BF_3$ and ammonia as raw materials at about 1600° C.

Five trial tests were additionally conducted by actually using silica glass jigs made of the crystal-contained silica glass respectively produced in Examples 1 and 2, and of the silica glass produced in Comparative example 3 with no thin film thereon, and silica glass jigs made of the crystal-contained silica glass produced in Examples 1 and 2 (which are respectively expressed with Examples 6 and 7 in Table 3) with vapor-deposited $Si_3N_4$ films of 50 μm thick thereon as holders for the lower electrode plate in a plasma etching apparatus for one month. The surfaces of the five holders and the coating conditions of the two thin films after the one month use were observed and the results are shown in Table 3.

TABLE 1

|  | Example 1 | Example 2 | Example 3 | Example 4 | Example 5 | Com Ex 1 | Com Ex 2 | Com Ex 3 |
|---|---|---|---|---|---|---|---|---|
| Size of Crystal (μm) | 40 | 100 | 40 | 500 | 40 | none | none | none |
| Thermal Expansion Coefficient (Average RT → 700° C.) | $1 \times 10^{-6}$ | $3 \times 10^{-6}$ | $1 \times 10^{-6}$ | $10 \times 10^{-6}$ | $1 \times 10^{-6}$ | $5 \times 10^{-7}$ | $5 \times 10^{-7}$ | $5 \times 10^{-7}$ |
| Transmittance at 2 μm | 1.0 | 0.3 | 0.5 | 0.1 | 0.5 | 8 | 5 | 80 |
| Bending Strength (kg/cm$^2$) | 350 | 200 | 250 | 150 | 250 | 500 | 500 | 550 |

TABLE 2

|  | Example 6 | Example 7 | Example 8 | Example 9 | Example 10 | Com Ex 4 | Com Ex 5 | Com Ex 6 |
|---|---|---|---|---|---|---|---|---|
| i Poly Si film | no peeling | no peeling | no peeling | no peeling | no peeling | peeled | peeled | peeled |
| ii Si3N4 film | no peeling | no peeling | no peeling | no peeling | no peeling | peeled | peeled | peeled |
| iii SiC film | no peeling | no peeling | no peeling | no peeling | no peeling | glass deformed no vapor Depo applicable | glass deformed no vapor Depo applicable | glass deformed no vapor Depo applicable |
| iv BN film | no peeling | no peeling | no peeling | no peeling | no peeling | glass deformed no vapor Depo applicable | glass deformed no vapor Depo applicable | glass deformed no vapor Depo applicable |

TABLE 3

|  | Example 1 | Example 2 | Com Ex 3 | Example 6 | Example 7 |
|---|---|---|---|---|---|
| Rough Surface | some | some | much | none | none |
| Etching | little | little | much | none | none |
| Coating State | — | — | — | good no peeling | good so peeling |

We claim:

1. A method of producing cristobalite containing silica glass, said method comprising preparing a mixture of a first crystalline silicon dioxide powder having a first melting point and a second crystalline silica dioxide powder having a second melting point which is at least 20° C. lower than the first melting point, the mixture containing said first silicon dioxide powder in the mixture in an amount of 10 wt. % to 80 wt. %, and heating the mixture at a temperature in a range between the second melting point and the first melting point.

2. A method of producing cristobalite containing silica glass as claimed in claim 1 wherein the mixture is heated at a first heating speed in the range of 10° C./min to 50° C./min from room temperature up to 1000° C., and then at a second heating speed of 10° C./min or less from the 1000° C. up to an intermediate temperature between the second melting point and 10° C. higher than the second melting point, and then at a third slow heating speed from said intermediate temperature up to a temperature lower than the first melting point.

3. A method of producing cristobalite containing silica glass as claimed in claim 1 wherein the crystalline silicon dioxide powders have particle diameters in the range of 10 μm to 1000 μm.

4. A method of producing cristobalite containing silica glass as claimed in claim 1 wherein the mixture is heated in an atmosphere of nitrogen flowing at a flow rate in the range of 5 l/min to 20 l/min so that small-sized independent dispersed bubbles are obtained in the silica glass.

* * * * *